United States Patent
Sandner et al.

(10) Patent No.: US 7,329,707 B2
(45) Date of Patent: Feb. 12, 2008

(54) PARTIALLY QUATERNISED, AMINO-FUNCTIONAL ORGANOPOLYSILOXANES AND THEIR USE IN AQUEOUS SYSTEMS

(75) Inventors: Bernhard Sandner, Geretsried (DE); Cristina Stanica, Wolfratshausen (DE); Rainer Hayessen, Geretsried (DE); Gunther Duschek, Benediktbeuren (DE)

(73) Assignee: Rudolf GmbH & Co. KG Chemische Fabrik, Geretsried (DE)

( * ) Notice: Subject to any disclaimer, the term of this patent is extended or adjusted under 35 U.S.C. 154(b) by 268 days.

(21) Appl. No.: 10/534,879

(22) PCT Filed: Nov. 13, 2003

(86) PCT No.: PCT/EP03/12703

§ 371 (c)(1),
(2), (4) Date: Oct. 19, 2005

(87) PCT Pub. No.: WO2004/044306

PCT Pub. Date: May 27, 2004

(65) Prior Publication Data

US 2006/0128880 A1    Jun. 15, 2006

(30) Foreign Application Priority Data

Nov. 14, 2002    (DE)    .................. 102 53 152

(51) Int. Cl.
C08L 83/08    (2006.01)
D06M 15/643    (2006.01)

(52) U.S. Cl. .................. 524/838; 252/8.61; 252/8.62; 252/8.63; 528/28; 528/38; 428/447

(58) Field of Classification Search .................. None
See application file for complete search history.

(56) References Cited

U.S. PATENT DOCUMENTS

| | | | |
|---|---|---|---|
| 3,033,815 A | 5/1962 | Pike et al. | |
| 3,207,707 A | 9/1965 | Klebe | |
| 4,533,714 A | 8/1985 | Sebag et al. | |
| 4,891,166 A | 1/1990 | Schaefer et al. | |
| 4,892,918 A * | 1/1990 | Ryang | 528/15 |
| 5,039,738 A | 8/1991 | Czech | |
| 5,707,435 A | 1/1998 | Halloran | |
| 5,807,956 A * | 9/1998 | Czech | 528/28 |
| 6,201,093 B1 | 3/2001 | Messner et al. | |
| 2004/0048996 A1 * | 3/2004 | Lange et al. | 528/10 |

FOREIGN PATENT DOCUMENTS

| | | |
|---|---|---|
| DE | 1 493 384 | 1/1969 |
| DE | 37 05 121 A1 | 9/1988 |
| DE | 196 52 524 A1 | 6/1998 |
| DE | 100 04 321 | 8/2001 |
| DE | 100 04 321 A1 | 8/2001 |
| EP | 0 138 192 A1 | 4/1985 |
| FR | 1184198 | 10/1957 |
| GB | 1006729 | 4/1963 |
| JP | 2002-157285 | 5/2002 |
| WO | 88/08436 | 11/1988 |
| WO | 02/10256 A1 | 2/2002 |
| WO | 02/10259 A1 | 2/2002 |
| WO | 02/10501 A1 | 2/2002 |

OTHER PUBLICATIONS

Stela Dragan et al., "Ionic Organic/Inorganic Materials. I. Novel Cationic Siloxane Copolymers Contaiing Quaternary Ammonium Salt Groups in the Backbone", Journal of Polymer Science: Part A: Polymer Chemistry, vol. 40, 2002, pp. 3570-3578.
Walter Noll, "Chemistry and Technology of Silicones", Academic Press New York and London, 2nd edition 1968, pp. 166- et seq.
Michael A. Brook, "Silicon In Organic, Organometallic, and Polymer Chemistry", 2000, pp. 258 et seq.

* cited by examiner

*Primary Examiner*—Marc S. Zimmer
(74) *Attorney, Agent, or Firm*—Buchanan Ingersoll & Rooney PC

(57) ABSTRACT

This invention concerns preparations containing partially quaternized amino-functional organopolysiloxanes and use thereof in aqueous systems on textile substrates. The preparations contain (1) 2 to 60 percent by weight of a partially quatenized amino-functional organopolysiloxane, (2) 2 to 40 percent by weight of an emulsifier, (3) 0 to 15 percent of a hydrotrope and (4) 20 to 95 percent by weight of water, with the proviso that the total nitrogen content of component (1) is in the range from 0.05 to 2.0 percent by weight, based on the overall composition of component (1).

3 Claims, No Drawings

PARTIALLY QUATERNISED, AMINO-FUNCTIONAL ORGANOPOLYSILOXANES AND THEIR USE IN AQUEOUS SYSTEMS

CROSS REFERENCE TO RELATED APPLICATIONS

This application claims priorities under 35 U.S.C. §119 to German Application No. 102 53 152.8 filed Nov. 14, 2002, and under 35 U.S.C. §371 to PCT Application No. PCT/EP03/012703 filed as an International Application on Nov. 13, 2003 designating the U.S., the entire contents of which are hereby incorporated by reference in their entireties.

BACKGROUND

Partially quaternized amino-functional organopolysiloxanes and use thereof in aqueous system on textile substrates are disclosed.

Organopolysiloxanes containing amino groups have long been used as textile finishes. Good and soft hand (hereinafter called softness effects) is achieved on textiles treated therewith. Preference is given to using organopolysiloxanes having the amino-functional group

—$(CH_2)_3NH(CH_2)_2NH_2$.

Such amino-containing organopolysiloxanes when used in textile finishing are customarily present in the form of aqueous microemulsions whose preparation is described in WO 88/08436 for example. Clear microemulsions are produced by heating a mixture of acid-neutralized amino-containing organopolysiloxane, water and emulsifier. According to the process described in EP-A 0138 192, this goal is achieved by shear emulsification in concentrated form, containing little water, by proceeding from the basic ingredients of amino-containing organopolysiloxane in neutralized form, emulsifier and water.

Advantageous softness effects are obtained with organopolysiloxanes whose amino functions are present in the form of the aminoethylaminopropyl groups mentioned. The morphological molecular structure of this side chain is believed to possess particular affinity for the fibre molecules of the textile substrate by embracing them. This results in the polymer molecule having a specific orientation which is responsible for the good softness. This is indirectly corroborated by the fact that acylation (acetylation) of the outer, primary amino functions has an appreciable adverse effect on the softness of the textile substrates treated therewith, since the different kind of molecular structure no longer permits adequate embracing of the fibre molecules and the associated specific orientation.

The amino-containing organopolysiloxanes described and the organopolysiloxanes containing acylated amino groups are typically present as readily dissociable ammonium salts of organic or inorganic acids when in the form of their microemulsions. At above pH 7, the salts are converted into free bases. In the process, the stability of the microemulsions is reduced by the weaker dissociation in the alkaline region, and this in the case of insufficiently acidified textile material and resultant pH values above 7 leads to coalescence of the microemulsion particles and their floating as oil droplets on the surface of the treatment liquor. As the finishing process continues, the oil droplets can transfer to the textile material or else deposit on the rolls of the treatment assemblies. The textiles become stained with silicone spots which are very difficult or impossible to wash off.

This behaviour in textile finishing is an appreciable disadvantage since very many treatment steps to finish textile substrates are carried out in a strongly alkaline medium. Washing operations carried out with insufficient care may leave residual quantities of alkali on the substrate which are carried into the treatment baths during the subsequent finishing steps. Especially in equipment where the amount of treatment liquor is not very large, as in the case of a padder for example, the pH may in the process very quickly rise to above 9 and lead to the split emulsions mentioned.

A further disadvantage of the amino-functional polysiloxanes identified is a tendency to yellow which can arise at drying temperatures above 120° C. in the case of white and light-coloured textile substrates treated therewith.

The amino-functional polysiloxanes identified are used on all textile substrates in the prior art. Woven and knitted fabrics composed of natural fibres, such as cotton or wool for example, and also of synthetic fibres, such as viscose, polyester, polyamide or polyacrylonitrile for example, are successfully treated with such products on a large scale.

In some cases, it is a rather minor aspect of the finishing effects sought that amino-functional polysiloxanes endow textiles not only with good softness, but simultaneously also with a more or less pronounced, hydrophobic character. However, there are textile applications where hydrophobicity is unwelcome. For instance, towels are expected to have not only a good, fleecy softness but also excellent absorbency to achieve an optimal drying effect. Good absorbency is frequently likewise desired for underwear. Similarly, there are many clothing articles in the sports and out-doors sector, such as bicycling or soccer jerseys for example, where absorbency is a prerequisite for the textile base material as well as good softness. The use of amino-functional polysiloxanes is therefore limited or completely impossible in the cases mentioned.

It is also known that microemulsions of organopolysiloxanes bearing quaternary ammonium groups do not have the disadvantages which have been described with regard to thermal yellowing and with regard to stability in alkaline aqueous dilutions. As described hereinbelow, in some cases it is possible, depending on the method of making used and the composition, to achieve good hydrophilicity combined with good absorbency. Organopolysiloxanes bearing quaternary ammonium groups consequently constitute an improvement over amino-containing organopolysiloxanes with regard to these identified properties. However, the identified advantages of polysiloxanes bearing quaternary ammonium groups have to be weighed against the disadvantage that they, compared with polysiloxanes modified with lateral amino groups exclusively, generate less softness on textiles finished therewith.

Organopolysiloxanes bearing quaternary ammonium groups are known from the literature. Different ways are described to make them, and the quaternary ammonium groups of polysiloxanes obtained can be attached to different positions on the polymer backbone of the polysiloxan chain depending on the particular starting materials used and the methods of making. Lateral, terminal and polymer backbone internal positionings of the functional groups and also mixed forms thereof are possible.

For instance, DE-AS-14 93 384 describes a process for preparing organosiloxane compounds or compound mixtures wherein the corresponding methylhydrogenpolysiloxanes are used as starting materials. The methylhydrogenpolysiloxanes in question are generally equilibrated siloxane mixtures in which the number of methylhydrogensiloxy and dimethylsiloxy units conform to a random distribution. The organosiloxanes having quaternary ammonium groups are prepared in a conventional manner by reacting an epoxysiloxane with dimethylamine and converting the resulting dimethylaminoorganosiloxane with a hydrogen halide or with a methyl halide into the quaternary ammonium compound. The compounds prepared in this way are modified organopolysiloxanes where the quaternary ammonium groups are positioned laterally on the polysiloxan chain. The compounds mentioned are recommended for the water-repellent treatment of, for example, glass or aluminium surfaces.

A further way to prepare organopolysiloxanes having lateral quaternary ammonium groups is described in DE 19 652 524-A1. It involves, for example, aminoethylaminopropyl-containing organopolysiloxanes being reacted with methyl p-toluenesulphonate alkylating agent in the presence of water and suitable emulsifiers to form the corresponding quaternary organopolysiloxanes, a microemulsion forming at the same time. The disadvantage of these preparations is the fact that the softness of textiles finished therewith is less pronounced than that obtained with polysiloxanes modified exclusively with lateral amino groups.

The preparation and use of diquaternary polysiloxanes are described in U.S. Pat. No. 4,891,166. The synthesis is effected by reacting polysiloxanes containing terminal epoxy groups with tertiary amines in such ratios that there is at least one tertiary amino group for every epoxy group and the reaction takes place in the presence of an acid equivalent, based on the nitrogen atoms to be quaternized, at elevated temperature. The quaternary ammonium groups on the resulting diquaternary polysiloxanes are by virtue of this special method of preparation exclusively terminal-positioned. The compounds thus prepared are recommended for use in hair treatment agents and cosmetics. The disadvantage of these preparations, as the Applicant has found, is the fact that textiles treated therewith have a less pronounced softness compared with polysiloxanes modified with exclusively lateral amino groups.

A further way to prepare quaternarily modified organopolysiloxanes is described in DE 37 05 121-A1. In this case, the method of preparation is such that the quaternary ammonium groups are exclusively positioned within the polymer main chain. The method of polymerization involves for example a platinum-catalysed addition of allyl glycidyl ether onto $\alpha,\omega$-hydrogendimethylpolysiloxane and subsequent reaction of the resulting $\alpha,\omega$-diepoxypolysiloxane with a ditertiary alkyldiamine under acidic conditions. Hair care is contemplated as a possible use. Again, the disadvantage of these preparations, as the Applicant has found, is the fact that textiles treated therewith have a less pronounced softness compared with polysiloxanes modified with exclusively lateral amino groups.

WO 02/10259-A1 describes quaternarily modified organopolysiloxanes where the quaternary ammonium groups are likewise positioned within the polymer main chain and have terminal, tertiary amino functions. They are recommended for textile finishing and also for cosmetic formulations.

Further polyquaternary polysiloxane polymers having quaternary groups disposed within the polymer main chain are described in U.S. Pat. No. 4,533,714. They are used in cosmetic formulations for hair treatment.

U.S. Pat. No. 3,207,707 describes the preparation of polymers having nitrogen in the main chain, the nitrogen being present in the form of tertiary amino groups, although no quaternary ammonium groups are formed. The products thus prepared are described inter alia for use as packaging and insulating material.

U.S. Pat. No. 3,033,815 describes the preparation of organopolysiloxanes having laterally disposed amino-functional groups and recommended for use as a size for treating fibres, especially glass fibres.

WO 02/10501-A1 describes organopolysiloxanes for use as softeners having reduced foaming tendency which bear laterally disposed alkylated amino-functional groups.

U.S. Pat. No. 5,039,738 provides another way to prepare organopolysiloxanes having laterally disposed tertiary amino-functional groups. They are said to provide improved resistance to yellowing when used on textile substrates.

FR 1 184 198 A describes organofunctional alkylaminoalkylsilanes and organopolysiloxanes prepared therefrom whose laterally disposed amino-functional groups are present in tertiary form.

Silanes and siloxanes having a terminal quaternary ammonium group are described in GB 1 006 729 as useful for treating glass surfaces.

Cationic organopolysiloxanes are prepared in JP 02/157285-A. Because of only one terminal quaternary group, they have surface-active properties and are used as surfactants.

Cationic siloxane copolymers bearing quaternary ammonium groups in the main chain are described in Journal of Polymer Science: Part A: Polymer Chemistry, Vol. 40, 3570-3578 (2002). They are highly branched and are recommended for use as ion exchangers or in the sanitary sector.

SUMMARY

A preparation is disclosed for treating textile substrates from aqueous media which on the one hand possesses the advantages of quaternary amino-functional organopolysiloxanes, such as hydrophilicity, stability at high pH values and yellowing resistance, while on the other providing the good softness effects of organopolysiloxanes modified laterally with non-alkylated amino-functional groups.

DETAILED DESCRIPTION

It has been determined that, unexpectedly, features described herein can be achieved by the use of partially quaternized amino-functional organopolysiloxanes. Positioning of the quaternary ammonium groups on the polysiloxanes backbone is terminally in the $\alpha,\omega$ position and that of the amino-functional groups is laterally. Good stability under application conditions in a wide pH value range (especially between pH 7 and 12) and also high yellowing resistance are obtained. On the other hand, the preparations according to the invention provide excellent softness. It has been determined that, surprisingly, the resulting softness is even distinctly superior to that of polysiloxanes bearing exclusively the terminal quaternary ammonium groups. Furthermore, textiles finished with the preparations of the invention, especially towels, underwear and sportswear, are notable for high absorbency.

When exemplary preparations according to the invention are applied in the form of microemulsions, internal softness is preferentially obtained on cellulosic substrates since, owing to the low emulsion particle size of below 50 nm, the partially quaternized amino-functional polysiloxanes compounds are able to penetrate deeply into the yarn and fibre interior. When preparations are used in the form of macroemulsions having particle sizes above 50 nm, deposition can be preferentially achieved in the outer fibre and thread layers due to filtration effects. This leads to a different hand character, featuring greater surficial smoothness and more fullness.

Exemplary preparations are characterized by a content, based on the overall composition, of
(1) 2 to 60 percent by weight of a partially quaternized amino-functional organopoly-siloxane of the general formula

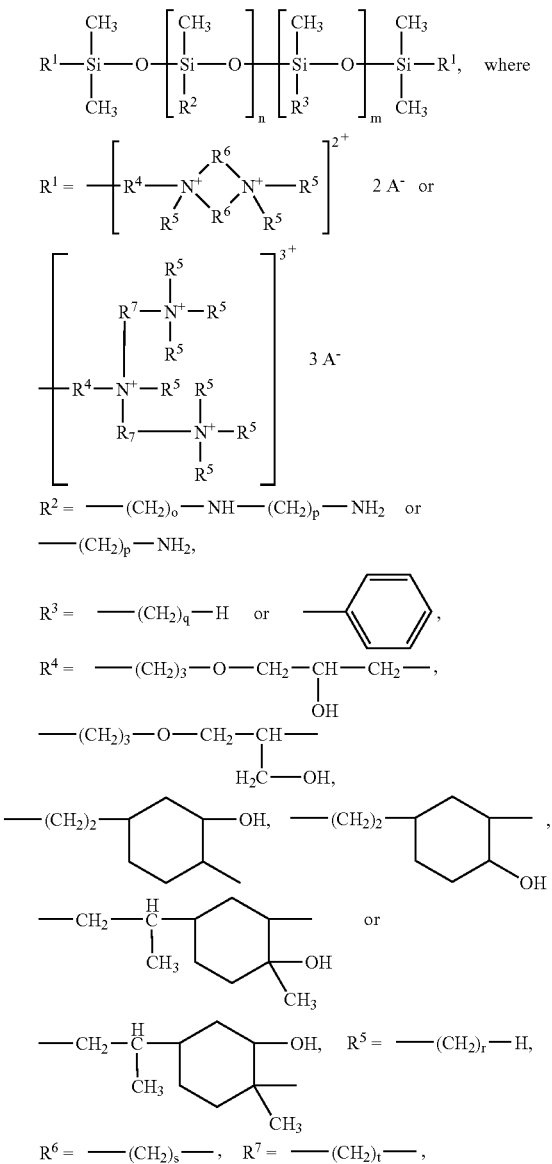

A⁻ represents inorganic or organic anions,
n represents an integer from 1-20, preferably 1-14 and more preferably 1-5,
m represents an integer from 20-2000, preferably 40-1000 and more preferably 40-120,
o and p each represent an integer from 1-10 and preferably from 2-4,
q represents an integer from 1-10 and preferably 1,
r represents an integer from 1-18 and preferably 1,
s represents an integer from 2-3 and preferably 2, and
t represents an integer from 2-5 and preferably 2-4,
with the proviso that the total nitrogen content of component (1) is in the range from 0.05 to 2.0 percent by weight, based on the overall composition of component (1),
(2) 2 to 40 percent by weight of an emulsifier,
(3) 0 to 15 percent by weight of a hydrotrope, and
(4) 20 to 95 percent by weight of water.

All the weight data for the preparations of embodiments of the present invention described herein are based on the overall composition of the preparation. Preferred ranges are a range of 10-40 percent by weight for component (1) and a range of 10-20 percent by weight for component (2). When component (3) is added, its concentration is preferably in the range of 1-10 and especially of 3-7 percent by weight. The preferred range for component (4) is 70-90 but especially between 60-90 percent by weight.

The nitrogen content of component (1) is preferably 0.1-1.5 percent by weight, but especially 0.1-1.0 percent by weight based on the overall composition of component (1).

The anions are derived from inorganic or organic acids. Examples of inorganic anions include chloride, bromide, iodide and sulphate; chloride and sulphate are preferred. Examples of organic anions are tosylate and acetate; tosylate is preferred.

The partially quaternized amino-functional organopolysiloxanes of component (1) are prepared by methods known to one skilled in the art. Thus, the present invention's components (1) can be synthesized by equilibration of terminally quaternized amino-functional organopolysiloxanes (preparable from terminally epoxy-functional organopolysiloxanes) with known silane hydrolysates bearing lateral amino groups in the presence of known equilibration catalysts.

Processes for analogous preparation of the terminally epoxy-functional organopolysiloxanes used as a starting compound are described for example in DE 3705121-A1, those for preparing the amino-functional intermediates obtained therefrom for example in WO 02/10256-A1 and those for preparing the quaternary intermediates obtained therefrom in turn for example in DE 19652524-A1. The preparation of the known silane hydrolysates used is described for example by W. Noll in "Chemie und Technologie der Silicone", 2nd edition 1968, page 168 et seq., and by M. A. Brook in "Silicon in Organic, Organometallic, and Polymer Chemistry", 2000, page 258 et seq.; aminoethylaminopropylsilane hydrolysates are commercially available. Known equilibration catalysts include for example boron trifluoride, trifluoromethanesulphonic acid and sulphuric acid. The subject matter of all of the documents mentioned in this application is hereby incorporated by reference in its entirety.

Useful emulsifiers (component (2)) include those on an anionic, cationic, nonionic or amphoteric basis or mixtures thereof. Preference is given to using ethoxylation products of aliphatic alcohols having 6 to 22 carbon atoms which contain up to 50 mol of ethylene oxide in adducted form. The alcohols may preferably contain 8 to 16 carbon atoms; they can be saturated, linear or preferably branched and can be used alone or mixed.

Of particular advantage with regard to low foaming in the application liquors are alcohols of the composition mentioned when their alkylene oxide radical is constructed from ethylene oxide and 1,2-propylene oxide in random distribution and preferably in block distribution.

Nonionic emulsifiers from the group of ethoxylated branched aliphatic alcohols will be particularly advantageous because of their favourable overall properties. The preparations according to the invention are therefore preferably made using for example ethoxylates of 2,6,8-trimethyl-4-nonanol, of isodecyl alcohol or of isotridecyl alcohol each with 2 to 50 molecules and especially 3 to 15 molecules of adducted ethylene oxide.

The optional used component (3), a hydrotrope, can typically be selected from the group of polyfunctional alcohols. It is thus possible to use dialcohols having 2-10, preferably 2-6 but especially 2-4 carbon atoms per molecule. Also of superior suitability are their mono- and diethers and also the mono- and diesters of these dialcohols. Examples of component (3) which are to be used with particular preference are butyldiglycol, 1,2-propylene glycol and dipropylene glycol.

To bring the partially quaternized amino-functional organopolysiloxanes into a form which can be applied from an aqueous medium, macro- or micro-emulsions can be produced therefrom by high shear stirring of the components (1) to (4) at temperatures between 20 and 70° C.

Exemplary embodiments provide for the use of the preparations in the finishing of textile substrates in aqueous baths and application liquors, if appropriate together with further preparation additives. Fabrics woven and knitted from natural fibres, such as cotton or wool for example, but also from synthetic fibres, such as viscose, polyester, polyamide or polyacrylonitrile for example, can be treated with the amino-functional polysiloxanes of the invention. The preparation additives which can be used in addition, if appropriate, can be for example chemicals for an wrinklefree finish, chemicals to improve the sewability of the textile substrate or other products typically used in textile application liquors.

The concentration of the exemplary preparations according to the invention in the application liquors is so chosen that the treated substrates contain between 0.3 and 0.6 percent by weight of partially quaternized amino-functional organopolysiloxanes based on the weight of the substrate.

A preferred way to apply the preparations of the invention is as a forced application, by drenching the substrate with the application liquor, then squeezing it off on a padder and finally subjecting it to a drying passage.

The examples which follow illustrate the invention. The chain lengths reported in the formulae of these examples for indices n and m defined in claim 1 are each an average value. The preparations used in the examples are produced by simply stirring the individual components together at 70° C.

EXAMPLE 1

Not Inventive

The preparation consists of an aqueous microemulsion containing 20 percent by weight of an organopolysiloxane having laterally positioned amino groups of the formula

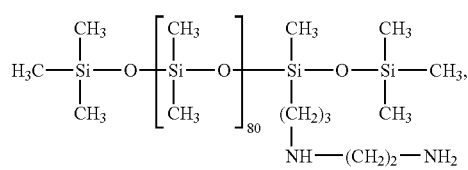

10 percent by weight of an isodecyl alcohol with 7 ethylene oxide groups, 3 percent by weight of butydiglycol and 0.4 percent by weight of 60% acetic acid. The overall nitrogen content of the organopolysiloxane is 0.44 percent by weight.

EXAMPLE 2

Not Inventive

The preparation consists of an aqueous microemulsion containing 20 percent by weight of an organopolysiloxane having terminally positioned and quaternized amino groups of the formula

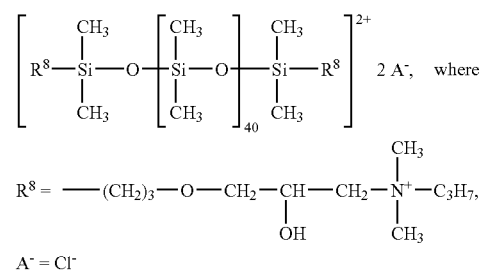

5 percent by weight of an isotridecyl alcohol with 6 ethylene oxide groups, 5 percent by weight of an isodecyl alcohol with 7 ethylene oxide groups and 7 percent by weight of butyldiglycol. The overall nitrogen content of the organopolysiloxane is 0.78 percent by weight.

EXAMPLE 3

Inventive

The preparation includes (e.g., consists of) an aqueous microemulsion containing 20 percent by weight of an organopolysiloxane having laterally positioned amino groups and also terminally positioned and quaternized amino groups of the formula (I)

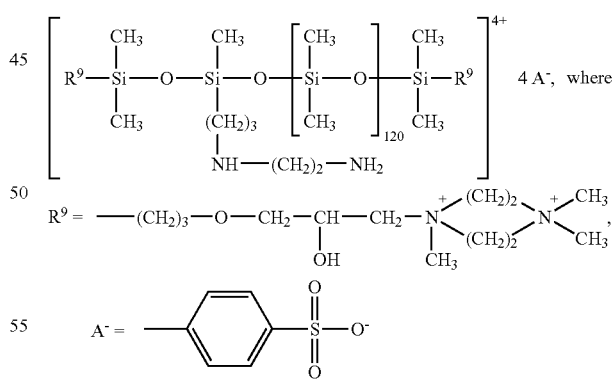

5 percent by weight of an isotridecyl alcohol with 6 ethylene oxide groups, 5 percent by weight of an isodecyl alcohol with 7 ethylene oxide groups and 7 percent by weight of butyldiglycol. The overall nitrogen content of the organopolysiloxane is 0.80 percent by weight.

The organopolysiloxane of the formula (I) is prepared in a similar manner to Part 1a) of Example 1 of WO 02/=10256-A1 by using a polydimethylsiloxane having terminal epoxy groups and an average chain length of 120 units, prepared in a similar manner to Example 1 of DE 3705121-A1. The intermediate product obtained is quaternized with methyl p-toluenesulphonate in isopropanolic solution in a manner similar to DE 19652524-A1 and, after the solvent has been distilled away, admixed with 2 percent by weight of an aminoethylaminopropylsilane hydrolysate. Following the addition of 0.15 percent by weight of trifluoromethanesulphonic acid the batch is stirred at 115° C. for 2 hours during which time the originally inhomogeneous, cloudy mixture converts into a clear, yellowish organopolysiloxane of the formula (I).

EXAMPLE 4

Inventive

The preparation includes (e.g., consists of) an aqueous microemulsion containing 20 percent by weight of an organopolysiloxane having laterally positioned amino groups and also terminally positioned and quaternized amino groups of the formula (II)

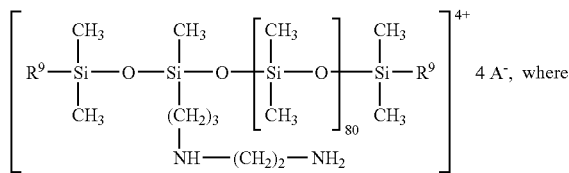

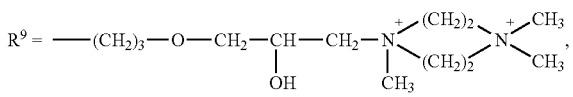

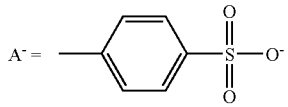

5 percent by weight of an isotridecyl alcohol with 6 ethylene oxide groups, 5 percent by weight of an isodecyl alcohol with 7 ethylene oxide groups and 7 percent by weight of butyldiglycol. The overall nitrogen content of the organopolysiloxane is 1.13 percent by weight.

The organopolysiloxane of the formula (II) is prepared in a manner similar to Example 3 by using a polydimethylsiloxane having terminal epoxy groups and an average chain length of 80 units. A clear yellowish organopolysiloxane is formed.

EXAMPLE 5

Inventive

The preparation includes (e.g., consists of) an aqueous microemulsion containing 20 percent by weight of an organopolysiloxane having laterally positioned amino groups and also terminally positioned and quaternized amino groups of the formula (III)

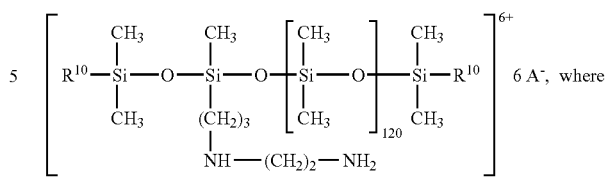

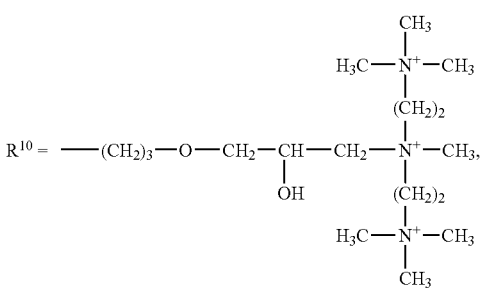

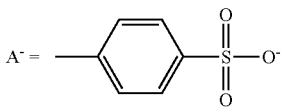

5 percent by weight of an isotridecyl alcohol with 6 ethylene oxide groups, 5 percent by weight of an isodecyl alcohol with 7 ethylene oxide groups and 7 percent by weight of butyldiglycol. The overall nitrogen content of the organopolysiloxane is 1.03 percent by weight.

The organopolysiloxane of the formula (III) is prepared in a similar manner to Example 4 of WO 02/10501-A1 by using a polydimethylsiloxane having terminal epoxy groups and an average chain length of 120 units, prepared in a similar manner to Example 1 of DE 3705121-A1. The intermediate product obtained is quaternized with methyl p-toluenesulphonate in isopropanolic solution in a manner similar to DE 19652524-A1 and, after the solvent has been distilled away, admixed with 2 percent by weight of an aminoethylaminopropylsilane hydrolysate. Following the addition of 0.15 percent by weight of trifluoromethanesulphonic acid the batch is stirred at 115° C. for 2 hours during which time the originally inhomogeneous, cloudy mixture converts into a clear, yellowish organopolysiloxane of the formula (III).

USE EXAMPLES

Hand Assessment

Portions cut from bleached cotton terry towelling which had not been optically brightened were impregnated with an aqueous liquor containing 20 g/l of the micro-emulsions produced according to the examples and 0.5 g/l of 60% acetic acid on a laboratory padder to a wet pick-up of 80% and then dried at 120° C. for 2 minutes. The hand character of the test fabrics treated with the microemulsions was subsequently assessed. This assessment is subject to individually different, subjective criteria. To obtain meaningful results nonetheless, at least 5 judges have to do the assessing. The results were evaluated by statistical methods, a rating of 1 denoting the softest, most pleasant hand and a rating of 10 denoting the harshest, least surficially smooth and most unpleasant hand within the test series.

| | Hand assessment rating within test series |
|---|---|
| Microemulsion of Example 1 | 1.5 |
| Microemulsion of Example 2 | 7.2 |
| Microemulsion of Example 3 | 2.1 |
| Microemulsion of Example 4 | 2.6 |
| Microemulsion of Example 5 | 3.4 |
| Untreated | 10 |

Hydrophilicity

Portions cut from bleached cotton terry towelling which had not been optically brightened were impregnated with an aqueous liquor containing 20 g/l of the micro-emulsions produced according to the examples and 0.5 g/l of 60% acetic acid on a laboratory padder to a wet pick-up of 80% and then dried at 120° C. for 2 minutes. The hydrophilicity was subsequently assessed according to the TEGEWA drop test (Melliand Textilberichte 68 (1987), 581-583).

| | Sink time (sec) |
|---|---|
| Microemulsion of Example 1 | above 180 |
| Microemulsion of Example 2 | 10 |
| Microemulsion of Example 3 | below 1 |
| Microemulsion of Example 4 | 1 |
| Microemulsion of Example 5 | 3 |
| Untreated | below 1 |

Yellowing

Samples cut from bleached cotton-modal knit fabric which had not been optically brightened were impregnated with an aqueous liquor containing 20 g/l of the microemulsions produced according to the examples and 0.5 g/l of 60% acetic acid on a laboratory padder to a wet pick-up of 80% and then dried at 120° C. for 2 minutes and subsequently cured at 170° C. for 2 minutes. The whiteness of the samples was then measured after Ganz on a "texflash 2000" whiteness meter from "datacolor international" (Switzerland).

| | Ganz whiteness |
|---|---|
| Microemulsion of Example 1 | 141.5 |
| Microemulsion of Example 2 | 151.0 |
| Microemulsion of Example 3 | 150.1 |
| Microemulsion of Example 4 | 147.8 |
| Microemulsion of Example 5 | 150.5 |
| Untreated | 151.8 |

Alkali Stability

The stability of the organopolysiloxane emulsions to alkalis in finishing liquors was tested according to the hereinbelow described test:

500 ml of a solution of the in-test organopolysiloxane emulsion having a concentration of 40 g/l were placed into a 1000 ml glass beaker as initial charge and adjusted to pH 12 with sodium hydroxide solution (w(NaOH)=10%). The liquor was subsequently stirred with a blade stirrer at 2000 revolutions per minute for twenty minutes. Upon expiration of this time the stirrer was switched off, the foam which had formed was allowed to collapse and the liquid surface was inspected after 1 hour for the presence of floaters (separated material which had floated to the surface of the liquid).

| | Evaluation after 1 hour |
|---|---|
| Microemulsion of Example 1 | substantial silicone floaters |
| Microemulsion of Example 2 | thin oil film on surface |
| Microemulsion of Example 3 | no floaters |
| Microemulsion of Example 4 | no floaters |
| Microemulsion of Example 5 | no floaters |

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. Preparations containing by content, based on an overall composition,
   (1) 2 to 60 percent by weight of a partially quaternized amino-functional organopolysiloxane of the general formula:

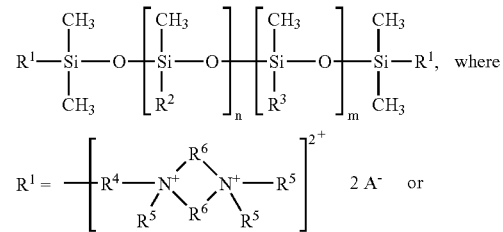

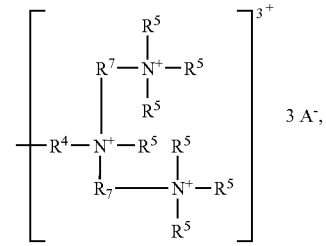

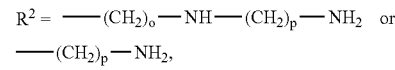

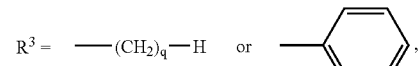

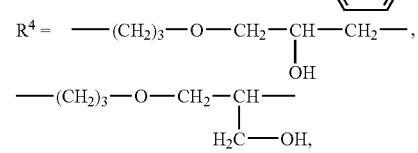

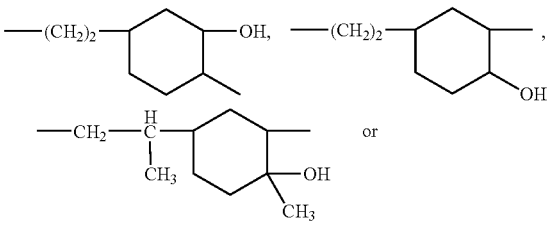

-continued

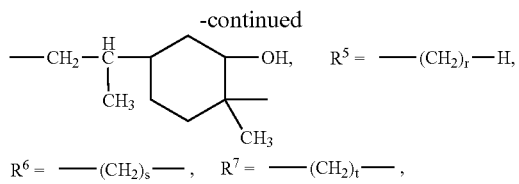

A⁻ represents inorganic or organic anions,
n represents an integer from 1-20,
m represents an integer from 20-2000,
o, p and q each represent an integer from 1-10,
r represents an integer from 1-18,
s represents an integer from 2-3 and
t represents an integer from 2-5,
   with total nitrogen content of component (1) being in a range from 0.05 to 2.0 percent by weight, based on the overall composition of component (1),
(2) 2 to 40 percent by weight of an emulsifier,
(3) 0 to 15 percent by weight of a hydrotrope, and
(4) 20 to 95 percent by weight of water.

2. A method of finishing of textile substrates in aqueous baths and application liquors by treating the textile substrates with the preparation according to claim 1.

3. Method according to claim 2, comprising:
   finishing the textile substrates with further fibre finishes.

* * * * *